United States Patent [19]

Ballinger

[11] E Patent Number: Re. 33,198

[45] Reissued Date of Patent: Apr. 17, 1990

[54] STRATA ROCK BUCKET

[76] Inventor: Paul V. Ballinger, 2047 Old Mill Rd., Findlay, Ohio 45840

[21] Appl. No.: 89,030

[22] Filed: Aug. 24, 1987

Related U.S. Patent Documents

Reissue of:

[64] Patent No.: 4,476,641
Issued: Oct. 16, 1984
Appl. No.: 510,383
Filed: Jul. 1, 1983

U.S. Applications:

[63] Continuation of Ser. No. 815,228, Dec. 31, 1985, abandoned, which is a continuation of Ser. No. 251,471, Apr. 6, 1981, abandoned.

[51] Int. Cl.[4] ..... E02F 9/28
[52] U.S. Cl. ..... 37/118 R; 37/142 R
[58] Field of Search ..... 37/118 R, 141 R, 141 T, 37/142 R

[56] References Cited

U.S. PATENT DOCUMENTS

| | | | |
|---|---|---|---|
| 711,992 | 10/1902 | Mason, Jr. | 37/141 T |
| 2,660,323 | 11/1953 | Carlesimo | 37/141 R |
| 2,838,856 | 6/1958 | Buisse | 37/142 R |
| 4,037,337 | 7/1977 | Hemphill | 37/141 T X |
| 4,133,121 | 1/1979 | Hemphill | 37/118 R |
| 4,238,896 | 12/1980 | Lanz et al. | 37/141 R |

FOREIGN PATENT DOCUMENTS

| | | | |
|---|---|---|---|
| 972397 | 8/1985 | Canada | 37/118 R |
| 125442 | 12/1967 | Czechoslovakia | 37/142 R |
| 982816 | 2/1965 | United Kingdom | 37/118 R |

*Primary Examiner*—Charles Pearson
*Attorney, Agent, or Firm*—Willian Brinks Olds Hofer Gilson & Lione

[57] ABSTRACT

A backhoe bucket especially adapted for use in rock strata such as caliche, limestone and soapstone and plastic soils includes a shovel-nose configuration having a plurality of spaced-apart teeth symmetrically arranged along upwardly and rearwardly inclined leading edges of the angled bucket sidewalls. The sidewalls of the bucket to which the teeth are attached intersect a flat, horizontal bottom having a width substantially equal to the width of the tooth mounted thereto. The teeth are arranged in a symmetrical stair-step configuration with each tooth being above and behind an adjacent tooth closer to the center of the bucket. The teeth first fracture, then separate and guide material into the bucket. The rear wall of the bucket is a complex, curved panel which defines an internal volume shaped to receive and readily discharge spoil.

13 Claims, 1 Drawing Sheet

STRATA ROCK BUCKET

Matter enclosed in heavy brackets [ ] appears in the original patent but forms no part of this reissue specification; matter printed in italics indicates the additions made by reissue.

[This] *This application is a continuation of reissue application Ser. No. 06/815,228, filed Dec. 31, 1985, now abandoned, which is a reissue of application Ser. No. 06/510,383 filed July 1, 1983 and issued as U.S. Pat. No. 4,476,641 on Oct. 16, 1984, which* is a continuation of application Ser. No. 06/251,471 filed Apr. 6, 1981, now abandoned.

BACKGROUND OF THE INVENTION

The invention relates generally to earth moving buckets and more specifically to backhoe buckets having a plurality of teeth disposed in a symmetrical arrangement along upwardly and rearwardly inclined bucket edges.

The backhoe is the mainstay of modern earth excavating and trenching equipment. A modern backhoe typically includes two boom structures which are pivotally interconnected. One of the booms may, optionally, be extensible. Pivotally secured to the free end of one of the booms is a pivotable bucket and the entire assembly is pivotally secured to a support which typically may be rotated about a vertical axis in a semi-circle. Suitably arranged and controlled double acting hydraulic cylinders provide motive force to these components.

The backhoe is a hybrid device which combines several features from prior art devices such as the shovel style and the drag line bucket excavators. The shovel style bucket excavator includes a shovel bucket disposed on a movable boom which includes teeth along the forward lower marginal edge. The bucket thus cuts and excavates while moving upwardly and/or away from the machine. The reaction forces to such movement tend to lift the rear portion of the machine. In the prior art, this problem was generally overcome by, first of all, building large, heavy machines and, second of all, adding additional weight to the rear portion thereof to counterbalance the digging forces. All of these approaches resulted in equipment which was costly, difficult to transport from job site to job site and was inefficient in operation. Since the bucket was, however, directly mounted upon a rigid boom, the digging accuracy thereof was good.

The drag line bucket is suspended from a single boom by a plurality of cables which typically may be independently played in or out to control the movement of the buckets. The cutting and excavating process is, of course, achieved while the bucket is being drawn toward the body of the machine and thus, due to the typically good frictional engagement between the machine and the ground, the maintenance of the machine in a stationary position during the excavation operation is not a problem. Accuracy, however, is. Harmonic oscillation of the bucket as it is being placed in position to continue a cut after it has been emptied is difficult to control. The drag line bucket therefore has been typically relegated to larger scale excavating operations wherein precise cuts and narrow trenches, for example, are not required.

The modern backhoe, as noted above, utilizes a pair of pivotally interconnected booms similar to those utilized in a shovel style excavator to provide accuracy of cut. The multiple axis movement of the bucket on the backhoe boom also permits cutting and excavating while the bucket is moving toward the backhoe, in the manner of the drag line bucket, thus eliminating reaction forces which may tend to raise the backhoe from the ground. The backhoe, it should also be appreciated, is capable of exceptionally accurate excavation.

Because of these advantages, the backhoe has been called upon to perform digging, excavating and trenching operations in increasingly difficult situations. For example, such excavating devices are frequently called upon to dig in hard materials such as frozen ground, broken concrete, and hard rock formations such as caliche, limestone and soapstone.

In such situations, several options have been available in the prior art. A common approach is to utilize a pick point on the backhoe to break up the hard material. Under certain circumstances such as digging through frozen ground to below the frost line, this expedient may be readily utilized inasmuch as only a relatively thin layer of hard material may need to be fractured before regular digging may be resumed with a conventional backhoe bucket. Obviously, the greater the relative quantity of hard material that must be fractured with the pick, the longer the excavating or trenching operation may take. To excavate a trench through caliche in this manner may thus substantially double the length of time required to complete the trench. For a contractor who did not anticipate such difficulties, the additional machine and personnel time will be costly.

A second approach may be to simply utilize conventional backhoe buckets and equipment in order to dig primarily by brute force. While this method will meet with varying success depending upon the particular material encountered, the deleterious effect upon equipment subjected to such service and perhaps the outright damage thereof militates against it. U.S. Pat. No. 3,065,557 discloses a third alternative wherein an impact hammer mechanism is disposed within a backhoe bucket itself and is utilized to penetrate and fracture various hard materials. Unfortunately this bucket design necessitates the supply of hydraulic fluid to the backhoe bucket. Such a system appears to be somewhat complicated and thus prone to service related failure.

SUMMARY OF THE INVENTION

The invention relates to an improved backhoe bucket specially adapted for use in hard materials such as rock strata, caliche, soapstone, and plastic soils such as clay. The bucket is fabricated of a plurality of panels and is of a generally shovel-nose configuration having a pair of downwardly and inwardly tapering sides which intersect a flat, narrow, horizontal bottom. The leading edge of the bucket slopes upwardly, outwardly and rearwardly from this horizontal bottom. A plurality of spaced-apart teeth each having a pair of symmetrical projections are symmetrically arranged along the leading edge of the bucket in a stair-step pattern. The single tooth which is secured to the bucket bottom is the leading or most forward tooth and thus achieves initial penetration when the bucket typically engages the ground. The other symmetrically arranged teeth subsequently penetrate and peel the ground or hard material up and into the bucket. The rear wall of the bucket is a complex, curved shape which receives excavated material and encourages ready discharge of such material from the bucket. The bucket sidewalls are tapered such that the bucket narrows slightly from front to rear and centerline to top in order to alleviate wedging of the bucket in a ditch.

An overall design goal of a bucket according to the instant invention is improved digging efficiency and reduced power consumption. As noted previously, brute force methods of excavation both waste power and shorten equipment life. By way of contrast, the instant invention utilizes a plurality of teeth which sequentially engage soil or hard material in a staggered, stepped-pattern defined by the points thereof. The dual points of the teeth provide a ripping action which is particularly adapted to the separation of layers of rock strata and therefore excavating such materials as caliche. The penetration afforded by the teeth significantly lowers the energy required to fracture and load the bucket with a given quantity of material. The reduced power consumption provides benefits not only directly with regard to the consumption of fuel but somewhat indirectly by reducing the forces and stresses on the boom and associated components of the backhoe.

Thus it is an object of the instant invention to provide a backhoe bucket suitable for excavating hard materials such as caliche, soapstone, and the like.

It is a further object of the instant invention to provide a backhoe bucket having a plurality of symmetrically arranged symmetrical teeth suitable for excavating in hard materials such as caliche, soatpstone, and the like.

It is a still further object of the instant invention to provide a backhoe bucket having teeth arranged in a symmetrical, stair-step design which exhibits substantially reduced energy consumption while digging in hard materials.

It is a still further object of the instant invention to provide an excavating bucket having teeth arranged in a symmetrical, staggered configuration which forms a similarly staggered bottom surface in excavated spoil consisting of plastic soil such as clay which facilitates discharge of the spoil from the bucket.

Further objects and advantages of the instant invention will become by reference to the following description of the preferred embodiment and appended drawings.

DESCRIPTION OF THE PREFERRED EMBODIMENT

Figure 1:
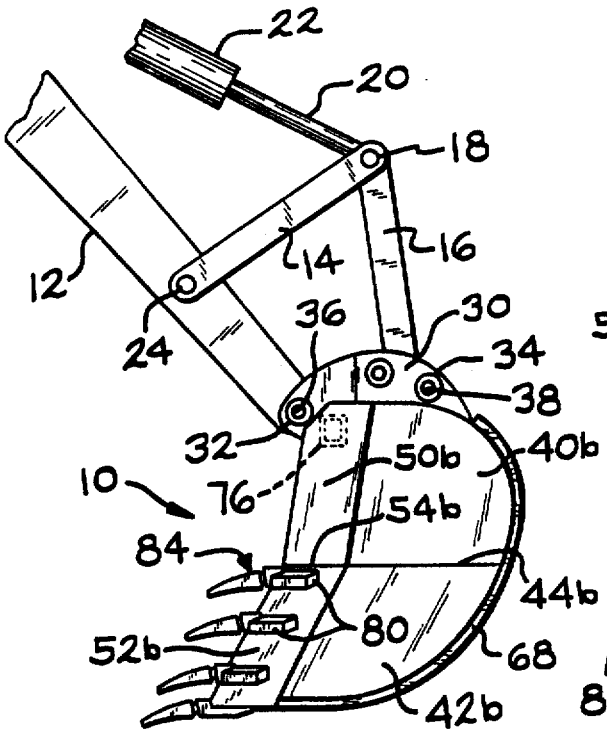
FIG. 1 is a side elevational view of a bucket according to the instant invention in place on a backhoe boom.

Referring now to FIG. 1, a backhoe bucket according to the instant invention is generally designated by the reference numeral 10. The bucket 10 is shown in place on a dipperstick 12 of a conventional backhoe (not illustrated). The backhoe also includes a pair of pivotally interconnected arms 14 and 16 which are interconnected and pivot about the axis of a pivot pin 18. Also pivotally secured for motion about the axis of the pivot pin 18 is a piston rod 20 of a double-acting hydraulic cylinder assembly 22. The end of the arm 14 opposite the pivot pin 18 is similarly secured to the dipperstick 12 by a pivot pin 24.

Figure 2:
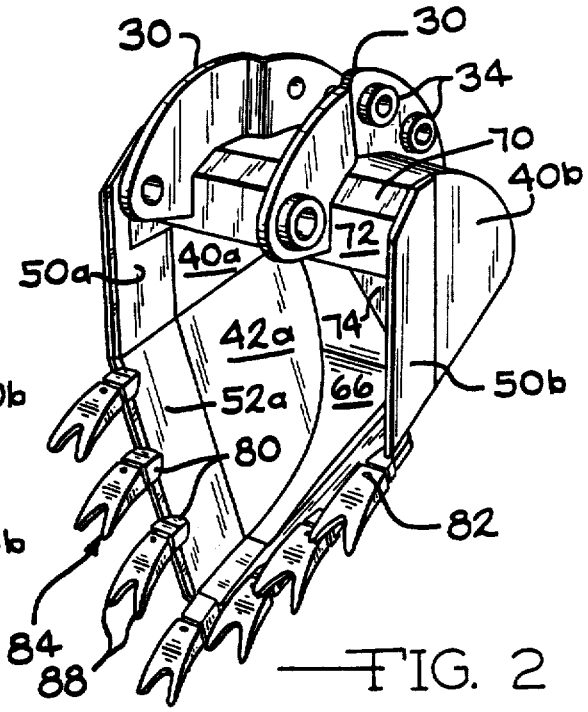
FIG. 2 is a perspective view of an excavating bucket according to the instant invention.
Figure 3:
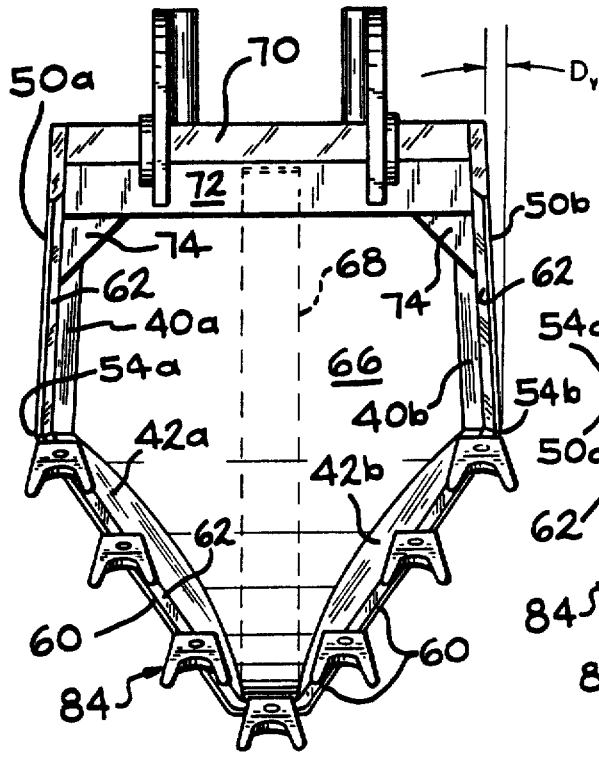
FIG. 3 is a front elevational view of an excavating bucket according to the instant invention which illustrates the staggered, symmetrical stair-step tooth arrangement.

Referring now to FIGS. 1, 2 and 3, the bucket 10 includes a pair of symmetrical generally parallel support structures 30. The support structures 30 include a forward pair of bushings 32 disposed generally adjacent the front of the bucket 10 and a top, dual pair of bushings 34 disposed in the generally uppermost region of the bucket 10. The pair of forward bushings 32 receives an elongate pivot pin 36 which extends between the bushings 32 and through a suitably sized aperture (not illustrated) in the end of the dipperstick 12. The lower end of the arm 16 includes a pivotally attached mounting structure (not illustrated) defining apertures which receive a pair of drive pins 38 which extend between the dual pair of bushings 34. The bucket 10 is thus pivotally secured to both the dipperstick 12 and to the arm 16 such that extension or retraction of the piston rod 20 of the double-acting hydraulic assembly 22 pivots the bucket 10 about the axis defined by the pivot pins 36 according to conventional practice.

The bucket 10 is fabricated of a plurality of metal plates or panels which are preferably secured together by welding and include a symmetrically disposed pair of upper sidewall panels 40a and 40b which are respectively connected to a pair of downwardly and inwardly inclined lower sidewall panels 42a and 42b along a left hip line 44a and a right hip line 44b, respectively. In fact, the entire bucket 10 is symmetrical about a vertical reference midplane (not illustrated) when viewed head-on as in FIG. 3. The upper sidewall panels 40a and 40b are disposed downwardly and outwardly at a slight angle from the vertical to provide a slight draft to the width of the bucket 10, designed "Dv" in FIG. 3, such that the left and right hip lines 44a and 44b, respectively, represent the maximum width of the bucket 10. As previously stated and illustrated in FIG. 4, the intersection of the sidewall panels 40a and 42a and 40b and 42b define the left and right hip lines 44a and 44b, respectively, which taper inwardly toward the rear of the bucket 10 to provide a similar horizontal draft in the bucket designated "Dh". The forward portion of the sidewalls of the bucket 10 are defined by two pairs of panels: a first pair of symmetrically disposed forward, upper sidewall panels 50a and 50b and a second, symmetrically disposed, inwardly inclined pair of forward, lower sidewall panels 52a and 52b. The forward, upper and lower pairs of sidewall panels 50a and 50b and 52a and 52b, respectively, intersect along respective right and left hip lines 54a and 54b. The hip lines 54a and 54b are parallel and thus the intersecting panels defining them, namely the panels 50a and 52a and 50b and 52b, respectively, do not include horizontal draft similar to the draft "Dh" which the hip lines 44a and 44b define. The forward, upper pair of sidewall panels 50a and 50b do, however, define and include vertical draft "Dv" equal to the draft of the upper sidewall panels 40a and 40b. Similarly, the forward, lower sidewall panels 52a and 52b do not include horizontal draft (See FIG. 4) although they are, of course, inclined at a significant angle to the vertical as illustrated in FIG. 3. A narrow, horizontal bottom panel 56 is disposed between the downwardly and inwardly inclined forward, lower sidewall panels 52a and 52b. The panels 50a, 52a, 56, 52b and 50b thus define a five sided leading edge 60. The leading edge 60 is defined by a continuous adjacent bevel or chamfer 62 on the inside of the bucket 10. The thickness of the leading edge 60 which is presented to and which engages material is thus substantially less than the thickness of the panels 50a, 50b, 52a, 52b and 56. The most forward portion of the leading edge 60 is defined by the bottom panel 56. From the bottom panel 56, the leading edge 60 extends upwardly, outwardly and to the rear to intersect the forward, upper sidewall panels 50a and 50b.

The rear portion of the bucket 10 is formed by unitary curved panel 66 which extends from the bottom panel 56, upwardly and outwardly along its intersection with the pair of lower sidewall panels 42a and 42b, upwardly and generally forwardly along its intersection with the upper sidewall panels 40a and 40b and finally forwardly into contact with the forward, upper sidewall plates 50a and 50b. While it is preferable that the curved panel 66 be unitary, it should be understood that it may be fabricated of two or more panels which are subsequently secured together during the fabrication of the bucket 10. A web or keel 68 is secured to the outside of the curved panel 66 and extends from directly behind the bottom panel 56 along the midline of the bucket 10 to the region of the support structures 30. The keel 68 strengthens the bucket 10 and especially the bottom panel 56. The curved panel 66 or such plural panels preferably includes oblique and vertical transverse braces 70 and 72, respectively to which the forward portion of the support structures 30 are secured. Additional structural integrity of the bucket 10 is achieved by the inclusion of a pair of gussets 74 disposed generally between the vertical transverse brace 72 and the forward, upper sidewall panels 50a and 50b. Further strengthening may be achieved by the inclusion of a box girder 76 disposed generally within the upper region of the bucket 10 which extends between the forward, upper sidewalls 50a and 50b. The box girder 76 may be disposed directly adjacent or comprise a portion of the vertical transverse brace 72.

Referring now to FIGS. 1 and 2, the forward, lower sidewall panels 52a and 52b and the bottom panel 56 which define a portion of the leading edge 60 include a plurality of digging tooth receiving lugs 80. The lugs 80 are conventional and may be secured to the bucket 10 by conventional welding techniques or other suitable means. The lugs 80 are disposed in substantially uniform spaced-apart relationship along the leading edge 60 of the bucket 10 and each define an opening (not illustrated) which receives a retaining pin 82. Secured by the retaining pin 82 to each of the lugs 80 is a digging tooth 84 which defines a generally downwardly sloping unitary surface 86 terminating in a pair of horizontally spaced-apart points 88. Secured generally equivalently relative to the leading edge 60, the teeth 84 duplicate the profile thereof and each tooth 84 disposed further away from the center of the bucket 10 is positioned higher up and further back than an adjacent tooth 84 closer to the center and vice versa. Viewed either in elevation or plan, the teeth 84 define a symmetrical stair-step pattern centered about the tooth 84 secured to the bottom panel 56. Preferably the width of the bottom panel 56 is approximately equal to the distance between the spaced apart points 88 of the tooth 84 associated therewith. Reference to FIG. 3 clarifies the symmetrical, vertical stair-step orientation of the teeth 84 and specifically the points 88. The distance between the points 88 on a given tooth 84 defines the tread of a stair step and the vertical height difference between adjacent teeth 84 defines the height of the riser. It should be apparent that the maximum width of each of the teeth 84 is that distance between the outside of the points 88. This width is also the maximum effective cutting or ripping width of each of the teeth 84. As FIG. 3 illustrates, the teeth 84 are arranged such that the leftmost edge of the left point 88 of one of the teeth 84 is in substantially vertical alignment with the rightmost edge of the right point 88 of the adjacent tooth 84. Thus though arranged in an upwardly and outwardly extending stair-step pattern when viewed in elevation, the arrangement of teeth 84 upon the bucket 10 effectively provides a ripping and cutting action across the entire width thereof.

Figure 4:
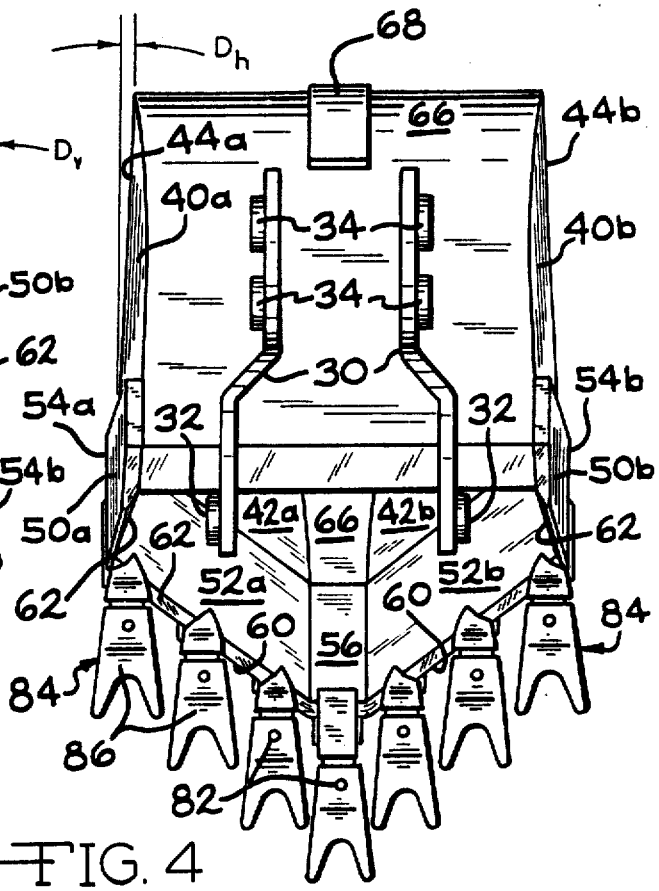
FIG. 4 is a top plan view of an excavating bucket according to the instant invention which illustrates the staggered, symmetrical receding tooth configuration of the instant invention.

As FIG. 4 illustrates, the teeth 84 are also disposed in a symmetrical, horizontal stair-step pattern. It should be noted that the tooth 84 secured to the bottom panel 56 is the forwardmost of the teeth 84 and that the remaining teeth 84 are disposed in symmetrical pairs at increasingly greater distances behind the forwardmost tooth 84 and at increasingly greater distances above it.

In operation, a bucket 10 according to the instant invention exhibits significantly improved performance over those bucket designs in the prior art. The advantage and the benefits are particularly significant when the bucket 10 is utilized to excavate hard materials such as caliche and soapstone. The disposition of the teeth 84 including the single forward tooth 84 secured to the bottom plate 56 concentrates digging energy there as the bucket 10 begins a cut. As the bucket 10 engages the soil, rock or other material, the teeth 84 disposed upwardly and to the rear of the tooth 84 secured to the bottom plate 56 sequentially engage the soil or rock and separate it by ripping and tearing. Rock strata and other materials such as caliche are thus fractured and the upwardly inclined surfaces 86 of the teeth 84 move the material up and into the bucket 10 proper. In plastic soils such as clay, a clear stair-step pattern on the lower portion of the material received within the bucket 10 will be visible. This stair-step pattern inhibits the suction retention of such material within the bucket 10 and encourages rapid and expedient discharge. The vertical and horizontal draft of the sidewall panel of the bucket 10 further improves performance by lessening power requirements and minimizing the likelihood of wedging the bucket within a trench or similar narrow region. Finally, the narrow leading edge 60 slices through material with greater ease than an edge having a width as great as the sidewall panels 50a, 50b, 52a and 52b and the bottom panel 56. The leading edge 60, is, however, not so narrow as to lack strength.

The foregoing disclosure is the best mode devised by the inventor for practicing this invention. It is apparent, however, that devices incorporating modifications and variations will be obvious to one skilled in the art of excavating machines and buckets. Inasmuch as the foregoing disclosure is intended to enable one skilled in the pertinent art to practice the instant invention, rather than being limited thereby, it should be construed to include such aforementioned obvious variations and be limited only by the spirit and scope of the following claims.

What is claimed is:

1. An excavating bucket for use with backhoes and similar machines comprising, in combination, a bucket assembly having a top portion, means disposed on said top portion for removably securing said bucket to associated equipment, a first pair of upper sidewalls [disposed substantially but not parallel to one another], a first pair of lower sidewalls intersecting a respective one of each of said first pair of upper sidewalls along a first pair of hip lines, said first pair of lower sidewalls extending from a respective one of each of said first pair of upper sidewalls away from said top portion and toward one another at an acute angle, a bottom panel extending between said first pair of lower sidewalls, a back wall extending between said bottom panel and said top portion, a second pair of upper sidewalls extending between a respective one of said first pair of upper sidewalls and said back wall [and disposed substantially but not parallel to one another], a second pair of lower sidewalls intersecting a respective one of each of said second pair of upper sidewalls along a second pair of hip lines, said second pair of lower sidewalls extending between a respective one of said first pair of lower sidewalls and said back wall, said first pair of lower sidewalls defining a respective pair of inclined leading edges extending from said bottom panel in a diverging manner generally toward said back wall and said top portion to said first pair of hip lines, and a plurality of teeth disposed in mirror-image pairs on said pair of leading edges and in substantially uniformly spaced-apart position along the length of said leading edges between said bottom panel and said first pair of hip lines, *said hip lines being disposed generally medially between said bottom panel and said top portion,* said bucket having its maximum width at said hip lines, the width of said bucket decreasing in [both upper and lower directions] *at least the downward direction* from said hip lines and said bucket having its most widely spaced pair of said teeth located substantially at said hip lines.

2. The excavating bucket of claim 1 wherein said teeth include spaced-apart symmetrical points and an intermediate surface sloping away from said top portion and said back wall.

3. The bucket of claim 1 wherein said leading edge is defined by an adjacent beveled surface.

4. The excavating bucket of claim 1 further including at least four of said teeth disposed in spaced-apart mirror-image pairs along said pair of leading edges, whereby said pairs of said teeth disposed at given distances from said bottom panel are closer to said top portion and farther apart from other pairs of said teeth at lesser distances from said bottom panel.

[5. The bucket of claim 1 wherein said hip lines are disposed generally medially between said bottom panel and said top portion.]

6. The bucket of claim 1 wherein said pairs of hip lines define a reference midplane disposed substantially medially between said bottom panel and said top portion.

7. The bucket of claim 1 further including a tooth disposed on said bottom panel equally spaced from said first, lower sidewalls and extending forward of said adjacent mirror-image pair of teeth.

8. An excavating bucket for use with backhoes and similar machines comprising, in combination, a bucket assembly having a top portion, means disposed on said top portion for removably securing said bucket to associated equipment, a first pair of upper sidewalls [disposed substantially parallel but not parallel to one another], a first pair of lower sidewalls joining a respective one of said first pair of upper sidewalls along first hip lines and extending away from said top portion and toward one another at an acute angle, said first hip lines representing the points of maximum width of said first pairs of sidewalls, a bottom panel extending between said first pair of lower sidewalls, a back wall extending between said bottom panel and said top portion, a second pair of upper sidewalls extending between a respective one of said first pair of upper sidewalls and said back wall, a second pair of lower sidewalls joining a respective one of said second pair of upper sidewalls along second hip lines and extending between said respective one of said upper sidewalls and said back wall, said second hip lines representing the points of maximum width of said second pairs of sidewalls, said first pair of lower sidewalls including oblique leading edges extending from said bottom panel in a diverging manner generally towards said back wall and said top portion, and a plurality of teeth having a pair of substantially equal, spaced-apart points, at least four of said teeth disposed in spaced-apart, mirror-image pairs on said pair of leading edges, whereby said pairs of said teeth disposed generally closer to said top portion are further apart and behind pairs of teeth closer to said bottom panel, wherein said second pair of upper sidewalls are closer together adjacent said top portion of said bucket assembly than at said second hip lines and said bucket has its maximum width at said hip lines, the width of said bucket decreasing in [both upper and lower directions] *at least the downward direction* from said hip lines and said bucket has its most widely spaced pair of said teeth located substantially at said hip lines.

9. The excavating bucket of claim 8 wherein said back wall is curved.

10. The excavating bucket of claim 8 further including at least four of said teeth disposed in spaced-apart, mirror-image pairs along said pair of leading edges, whereby pairs of said teeth disposed at given distances from said bottom panel are closer to said top portion and farther apart from other pairs of said teeth at lesser distances from said bottom panel.

11. The excavating bucket of claim 8 wherein said leading edge is defined by an adjacent beveled surface.

12. The excavating bucket of claim 8 wherein said teeth includes substantially equal, spaced-apart points and an intermediate surface sloping away from said top portion of said bucket assembly.

13. The bucket of claim 8 wherein said hip lines are disposed generally medially between said bottom panel and said top portion.

14. The bucket of claim 8 further including a tooth disposed on said bottom panel equally spaced from said first, lower sidewalls and extending forward of said adjacent mirror-image pair of teeth.

* * * * *